No. 709,725.  
C. SELTZ.  
BOOKKEEPING.  
(Application filed Jan. 20, 1902.)  
Patented Sept. 23, 1902.

(No Model.)  
4 Sheets—Sheet 1.

No. 709,725. Patented Sept. 23, 1902.
C. SELTZ.
BOOKKEEPING.
(Application filed Jan. 20, 1902.)
(No Model.) 4 Sheets—Sheet 2.

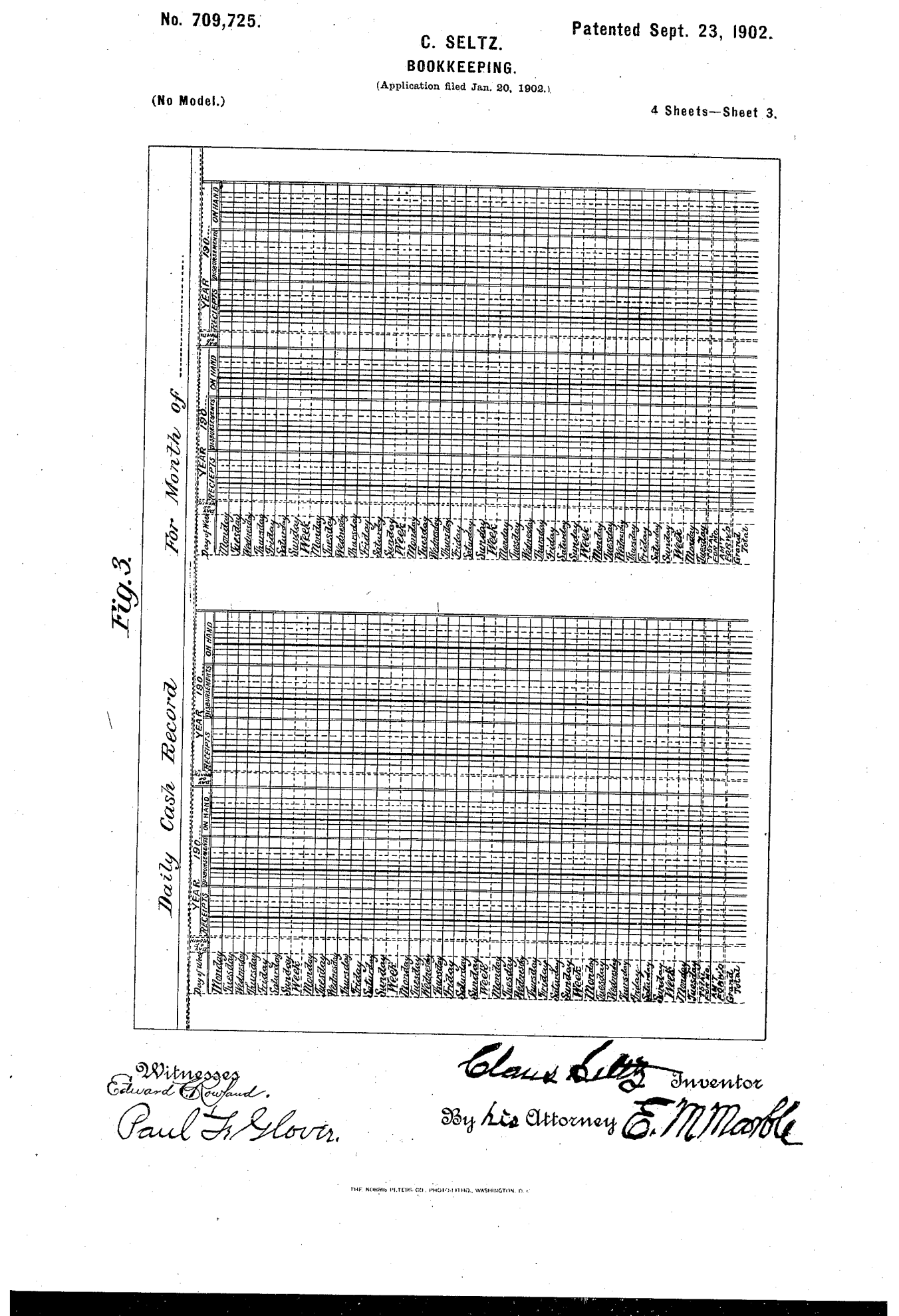

No. 709,725.

C. SELTZ.
BOOKKEEPING.
(Application filed Jan. 20, 1902.)

Patented Sept. 23, 1902.

(No Model.)

4 Sheets—Sheet 3.

Fig. 3.

Daily Cash Record For Month of _____

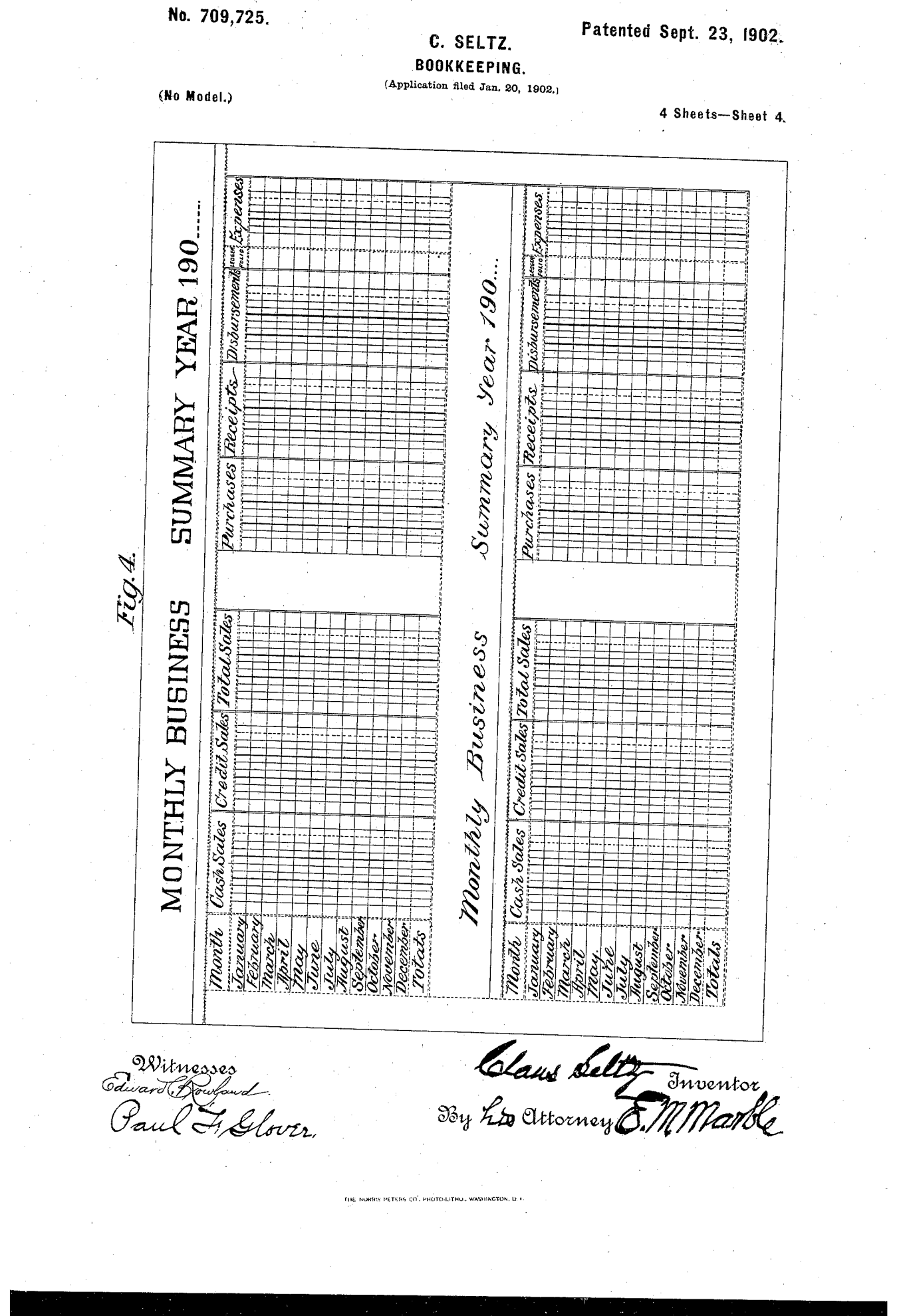

No. 709,725.

C. SELTZ.
BOOKKEEPING.
(Application filed Jan. 20, 1902.)

Patented Sept. 23, 1902.

(No Model.)

4 Sheets—Sheet 4.

Fig. 4.

UNITED STATES PATENT OFFICE.

CLAUS SELTZ, OF SEATTLE, WASHINGTON.

BOOKKEEPING.

SPECIFICATION forming part of Letters Patent No. 709,725, dated September 23, 1902.

Application filed January 20, 1902. Serial No. 90,453. (No model.)

*To all whom it may concern:*

Be it known that I, CLAUS SELTZ, a citizen of the United States, and a resident of Seattle, in the county of King and State of Washington, have invented certain new and useful Improvements in Bookkeeping, of which the following is a specification.

My invention relates to improvements in bookkeeping; and its especial object is to provide a quadrennial book-summary by which the accounts of any person, firm, company, or corporation may be readily referred to and the exact status of the account ascertained on any day of the week, month, or year to which the inquiry relates.

This invention is not a system of "bookkeeping," so called; but it is a book-summary which can be used in connection with any of the systems of bookkeeping now in use.

The object of my invention is to simplify and make easy and intelligent the work of the bookkeeper for any person, firm, company, or corporation.

My invention is intended to cover a period of four years in the business of any person, firm, company, or corporation, and hence the book-summary is arranged so as to include all of the business dealings of such person, firm, company, or corporation during that period.

In the systems of bookkeeping generally in use it is necessary to spend more or less time if inquiry is made in relation to the standing of any person, firm, company, or corporation as shown by said books with the person, firm, company, or corporation keeping the same in order to determine what such standing is; and one of the principal objects of this book-summary is to render it possible upon opening this book to show instantly just what the standing of such person, firm, company, or corporation is therewith.

My quadrennial book-summary is divided into four parts—viz., a bill-register, a daily sales-record for each month, a daily cash-record for each month, and a monthly business-summary.

The bill-register consists of two hundred pages, and these pages will have an alphabetically-arranged index cut and lettered on the edge of each page in the usual form. (Not shown.) The bill-register will be double-paged and is so ruled as to show proper entries under the following headings: "Date of bill, 190–;" "Filing No. —;" "Date of mdse. rec'd;" "Name of firm;" "Location;" "Amount;" "Am't not accepted;" "Errors, shortage or rebate;" "Discount 10, 30, or 60 days;" "Amount of discount;" "Net total amount due;" "When due;" "When paid;" "Amount;" "How paid, check or draft No. —;" "Remarks." At the lower left-hand corner of each page, on separate lines, will be the following words: "Total;" "Amount forw'd;" "Grand total." In the drawings, Figure 1, the lines in the several columns which are dotted lines will be printed in red ink and the lines which are full lines, either heavy or light, will be in black or blue ink, as preferred. The pages of the bill-register will be numbered from No. 1 to 200, and each page will have like columns, like headings to the columns, and will be indexed as hereinbefore stated. This bill-register, which constitutes the largest component part of this book-summary and which is arranged so as to be used with other component parts of the book, may, if found necessary, be increased or diminished in its number of pages, the style of the pages, the headings and the columns remaining the same.

The daily sales-record consists of twenty-four pages, each being double-paged, and each of these semi or half pages are again divided by columns, so as to make, in effect, a separate page or subpage for each month of the four years. Each double page has a heading, as follows: "Daily sales-record for month of —," as shown in Fig. 2. Each double page has one column for each day of the week, starting with "Monday," and at the end of each week is the word "Week," with a dotted line thereunder. The dotted lines on this sheet of drawings, Fig. 2, are to be in red ink, the other lines being in black or blue, as preferred. At the head of the four columns into which the double page is divided are found the words "Day of week;" "Day of month;" "Year," with the word "Cash" thereunder; "190–," with the word "Credit" thereunder; "Sales," with the word "Total" thereunder. The four columns of this double page are to be used in the same way—that is to say, the word "Monday" and the names of each of the successive days of the week are, in effect, to be carried across to the second column of each half-page and the day of the month written to the right thereof. In this manner each of the double pages of the daily sales-record may be used to compactly show in each of the four years the amount of cash received on each day, the amount of credit given on that day, and the total of the sales on that day. At the foot of each column of the days of the week are the following words: "Total for mo.," "Am't forw'd," and "Grand total." These words are also to be considered as written at the foot and to the left of the columns of the days of the month on each subpage.

The daily cash-record consists of twenty-four pages, each being double-paged, and each of these semi or half pages is again divided by columns, so as to make, in effect, a separate or subpage for each month of the four years. Each double page has a heading as follows: "Daily cash-record for month of —," as shown in Fig. 3. Each half-page has one column for each day of the week, starting with "Monday," and at the end of each week is the word "Week," with dotted lines thereunder. The dotted lines on this sheet of drawings, Fig. 3, are to be in red ink, the others being in black or blue, as preferred. At the upper end of the first and third of the four columns into which the double pages are divided are found the following words: "Day of month;" "Receipts;" "Disbursements;" "On hand." Above these three latter titles is the word "Year 190–." The four columns of this double page are to be used in the same manner—that is to say, "Monday" and the names of each successive day of the week are, in effect, to be carried across to the second column of each half-page and the day of the month written to the right thereof, the words "Receipts," "Disbursements," and "On hand" being written above, and above these words the word "Year 190–." In this manner each of the double pages of the daily cash-record may be used to compactly show in each of the four years the amount of cash received on each day, the amount of disbursements on each day, and the amount of cash on hand on each day. At the foot of each column of the days of the week are the following words: "Total for mo.," "Am't forw'd," and "Grand total." These are also to be considered as written at the foot and to the left of the columns of the days of the month on each subpage.

The monthly business-summary is composed of four one-half pages—that is to say, each full page is divided horizontally at about its vertical height or depth, each full page thereby representing the business of two years. Each half-page has the following heading: "Monthly business-summary year 190–." On the left side of each half-page is found at the head of each of these columns the word "Month," and under this "January," and the names of the other months of the year and then the word "Totals." The second column of each half-page is headed "Cash sales;" the third column, "Credit sales;" the fourth column, "Total sales;" the fifth column, "Purchases;" the sixth column, "Receipts;" the seventh column, "Disbursements;" the eighth column, "Ledger folio;" the ninth column, "Expenses."

It will thus be seen that this quadrennial book-summary provides a proper bill-register, a complete form for the daily sales-record, the daily cash-record, and the monthly business-summary for each of the four years, so that all of the business of any person, firm, company, or corporation can be intelligently kept, showing all of its transactions with persons, firms, companies, or corporations, also its daily sales, daily receipts, daily disbursements, amount of cash on hand on that day, and the totals of the amount of business for each year.

Having thus described my invention, what I claim, and desire to secure by Letters Patent, is—

1. A quadrennial book, having a set of leaves suitably ruled and appropriately designated for the reception of data relating to notes or bills; another set of leaves designated to receive respectively and in succession, data for successive periods of time, each leaf having appropriately-designated spaces for the reception of amounts of daily sales, one for each day of the period to which the page is devoted, the spaces of each page being arranged in several columns respectively designated to receive the said amounts, for the same period of a different year; another set similarly ruled and designated for the reception of daily cash receipts and disbursements; and another set of leaves having appropriately-designated spaces for the monthly business of each of the four years, each half-page having the names of the months of each year on the left side, and columns respectively designated for the amounts of the "cash sales," "credit sales," "purchases," "receipts," "disbursements," "ledger folio," and "expenses," of each month of one year, with the totals for each of the several items, substantially as described.

2. In a "quadrennial book-summary," a "daily sales-record," double-paged, each single page being so ruled as to make it a double page and designated as follows: over the first and second columns of the first and third subpages, with the words: "Day of week;" and "Day of month," under the words "Day of week," the words "Monday" and the successive days of the week, the second and fourth subpages being like the first and third, except the words "Day of week" are not set forth at the heading thereof, in a separate column, each of the subpages having the following words and figures, at the head of separate columns: "Year" under which is the word "Cash;" "190–" under which is the word "Credit;" "Sales" under which is the word "Total;" after the word "Sunday" of each week, the word "Week;" at the lower end of the first column, on the first and third subpages, on separate lines, the words "Total for mo.;" "Amount forw'd;" "Grand total," whereby a "daily sales-record" may be kept, substantially as and for the purposes set forth.

3. In a "quadrennial book-summary," a "daily cash-record," double-paged, each single page being so ruled as to make it a double page and designated as follows: over the first and second columns, of the first and third subpages, with the words: "Day of week;" and "Day of month;" under the words "Day of week," the words "Monday" and the names of the successive days of the week, the second and fourth subpages being like the first and third, except the words: "Day of week," are not at the head of a separate column, with the days of the week following; the words: "Receipts;" "Disbursements;" "On hand;" being at the head of separate columns, on each subpage, and above these words, the word and figures "Year 190–;" at the lower end of the first column, on the first and third subpages, on separate lines, the words: "Total for mo.;" "Amount forw'd;" "Grand total," whereby, a "daily cash-record," may be kept as and for the purposes set forth.

Signed at Seattle, in the county of King and State of Washington, this 20th day of December, A. D. 1901.

CLAUS SELTZ.

Witnesses:
H. H. EATON,
ADOLPH BEHRENS.